Figure 3:
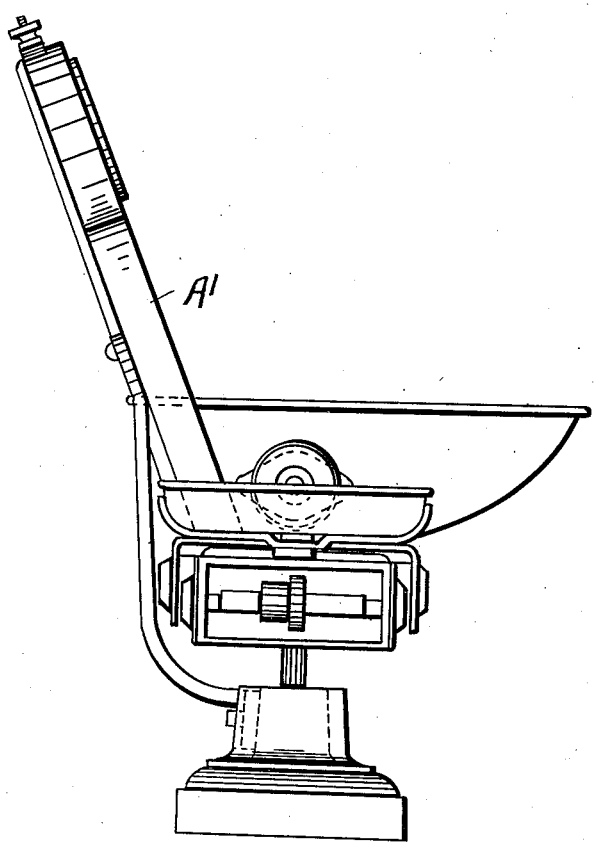

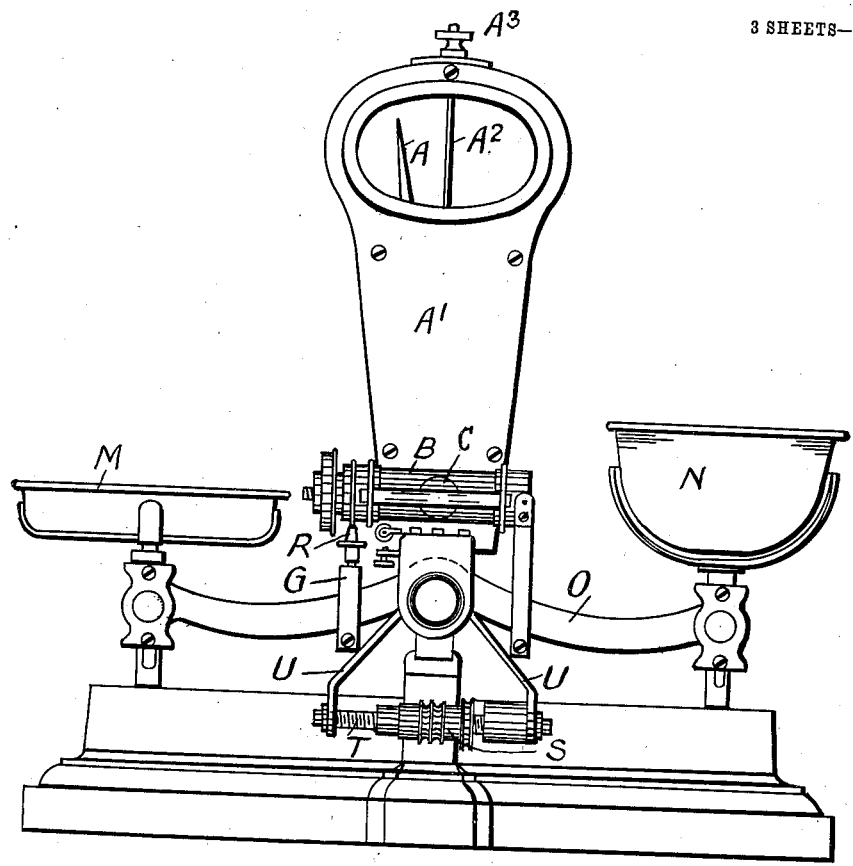
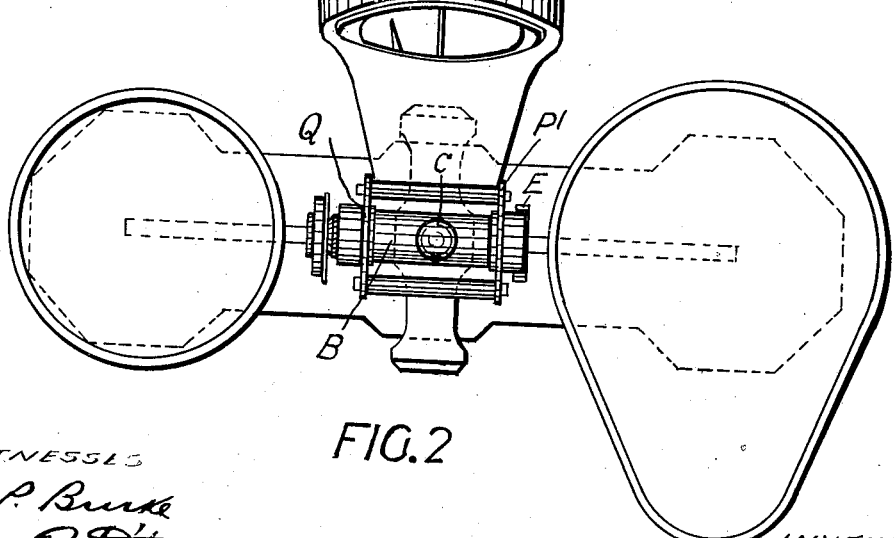

O. JONES.
BEAM SCALE.
APPLICATION FILED NOV. 30, 1907.

901,911.

Patented Oct. 20, 1908.

3 SHEETS—SHEET 2.

WITNESSES

INVENTOR
Oswald Jones

ATT'Y

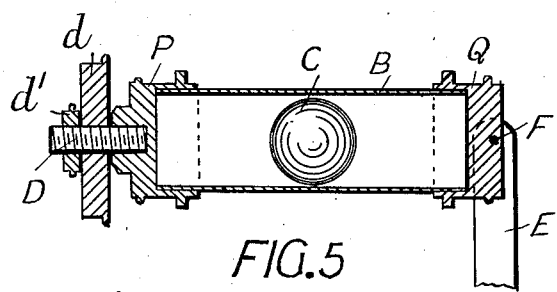
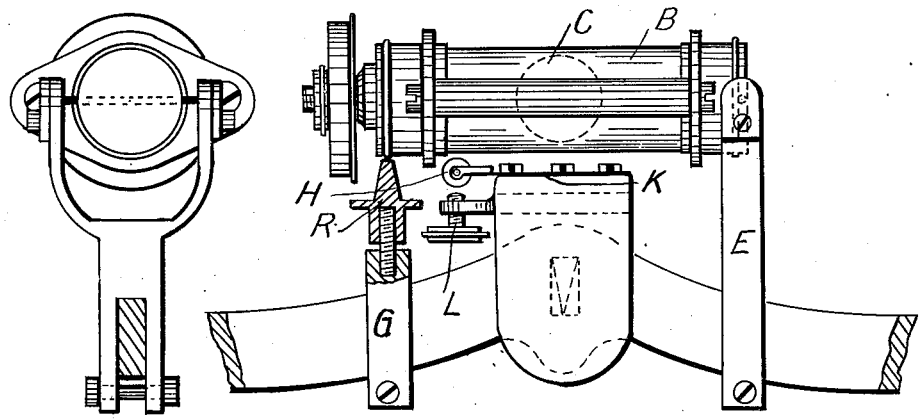
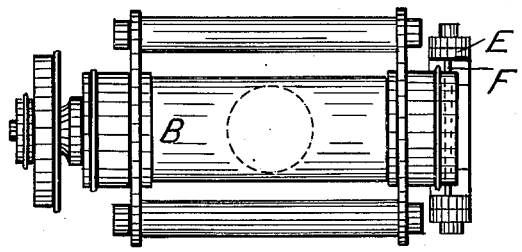

UNITED STATES PATENT OFFICE.

OSWALD JONES, OF REDFERN, NEAR SYDNEY, NEW SOUTH WALES, AUSTRALIA.

BEAM-SCALE.

No. 901,911.  Specification of Letters Patent.  Patented Oct. 20, 1908.

Application filed November 30, 1907. Serial No. 404,495.

*To all whom it may concern:*

Be it known that I, OSWALD JONES, a subject of the King of Great Britain and Ireland, and resident of Redfern, near Sydney, in the State of New South Wales, Commonwealth of Australia, have invented new and useful Improvements in Beam-Scales, of which the following is a specification.

My invention relates to beam scales and consists in a draft attachment coacting therewith which indicates when the overbalancing point is being approached and effects the sudden movement of the beam when the required weight of goods has been loaded into the pan, whereby exact and rapid weighing of bulk goods such as tea, sugar, coffee or flour is facilitated.

I am aware that various attachments have been proposed for the purpose of positively tipping the beam of a scale when the required weight on the pan has been reached, so that the result at which I aim is not wholly novel.

In carrying out my invention, I fit above the middle of the scale beam and supported thereon a tube containing a polished ball capable of rolling freely along said tube; a support to lift one end of this tube off the weight end of the scale beam while the load is being deposited in the pan is fitted on the frame; and an adjustable pendular balance is provided below the beam to regulate the balance and sensitiveness of it, which would otherwise be disturbed by the superposed weight of the tube and ball before mentioned. The latter feature may be omitted when the centers of the beam are so disposed as to make it balance correctly with the superposed weight. In either case the tube fitting is provided with a regulating nut to adjust the balance with precision.

The tube is so mounted that it overloads the pan end of the beam so as to cause the beam to move slightly before the pan has been filled to correspond with the weights carried on the weight end of the scale. This partial movement of the beam is indicated on a dial by a pointer fixed to the beam and serves to warn the operator that the load in the pan is within a small fraction of the weight required to tip the beam. As a further quantity is added to the pan the overload is relieved and the beam moves gradually until it reaches the intermediate level position. Instantly this position is passed the ball rolls along the tube towards the load pan, thus causing the beam to overbalance suddenly and definitely. Rapidity and precision of operation are thus made possible; exact weighing is effected without requiring withdrawals of overweight from the pan and eyesight judgment to determine whether the beam has or has not tipped over its center.

Figure 4:
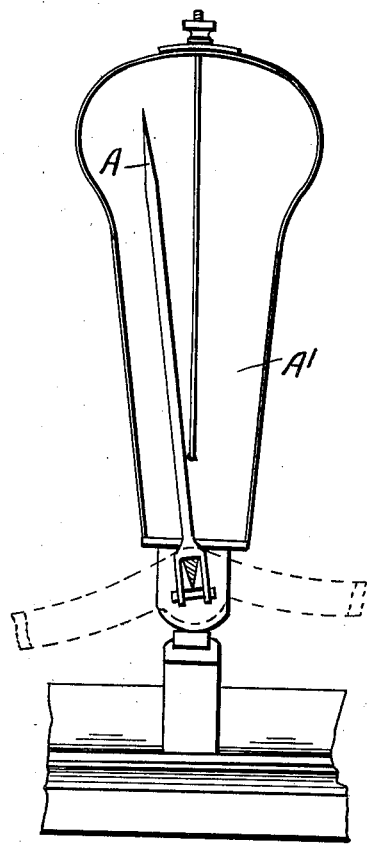

Referring to the annexed drawings:—Figure 1 is a front elevation of a counter scale embodying my invention; Fig. 2 top plan of same; Fig. 3 end elevation; Fig. 4 partial sectional elevation showing indicator and dial; Fig. 5 longitudinal section through the tube, showing ball therein in act of rolling; Fig. 6 sectional elevation showing in detail the mounting of the tube on the beam; Fig. 7 end elevation of same; Fig. 8 corresponding top plan.

The beam and the weight and load pans and the frame of the scale shown in the drawings exhibit no feature of novelty.

The beam movement indicator consists of a pointer A attached to the end of the axle of the beam O and moving over a dial inclosed in a casing A', A² being an adjustable gage to mark the critical balancing point of the beam.

A³ is a thumb nut for setting the gage A².

B is the balancing tube and C a polished ball of metal capable of rolling freely in said tube B by gravity when off the horizontal in either direction. This tube B is carried by metallic end covers P and Q. To one of these covers P a screwed stem D is fixed; it carries a nut $d$ and a jam nut $d'$. These nuts are for adjustment purposes. The other cover Q is carried in a fork E which is attached to the beam O, by means of a free working horizontal trunnion pin F which allows the tube B to swing vertically about it without friction.

G is a post fixed on the weight side of the scale beam and provided with a screwed head R by which its height may be adjusted. This post is regulated in height so that when the weight end of the beam is down there will be a little clearance between the post and the rim of the cover P. Under those circumstances the left hand end of the tube B is supported on a roller H carried on a very light flat spring K set on the scale frame.

L is a set pin by which the possible depression of the spring K under the weight of the tube B is controlled. Owing to the fact that the weight of the right hand end of the tube B is carried on the pan end of the beam while its left hand end is carried on the frame the beam will tip until the post G takes the weight of the tube from the roller H, and in tipping throw over the pointer A thereby indicating to the person using the scale that the required weight in the pan has been approached. Up to this time the tube B has not reached the horizontal position, and the ball C has therefore lain in its left hand end. The adjusting weights D D' and S are so set that the beam just balances at the horizontal when the tube is quite horizontal, so that the slightest downward movement of the load pan end of the beam and tube due to the addition of a very slight overweight will cause the ball C to run towards the load pan by gravity, thereby suddenly overweighting the pan end of the beam and causing the beam to tip down suddenly. The gage $A^2$ is set so that the pointer A registers with it exactly when the beam and tube lie horizontally and the load in the pan corresponds exactly with the weight. In view of the weight of the tube and other fittings located over the beam, the axis of the same must be set a little higher than ordinarily so that the fulcrum will be just above the center of gravity of the moving parts. The balance may however be preserved by providing a pendular compensator to set off against the top weight. This compensator consists of a weight S running on a threaded rod T carried by brackets U pendent from the beam or its axle. The rotation of this weight effects its movement along the rod T to one side or other depending on the direction of rotation of the weight.

The mode of operation is as follows:—The scale being properly adjusted as already described, the necessary weight is placed in the weight pan M, whereby that pan is tipped down, bringing the beam with it and leaving the left hand end of the tube B with the ball in it resting on the roller H. The goods to be weighed are now teemed gradually into the load pan N. When the necessary weight is being approached, the beam tips until the post G R lifts the left hand end of the tube B off the roller H, the pointer A meanwhile moving off the starting mark on the dial thus indicating to the operator that very little more need be added to the load pan to complete the weight. The necessary quantity is then added very gradually, the beam and pans meanwhile coming to the horizontal position and the pointer A gradually coming to register with the gage $A^2$. Immediately that position is passed, the ball C rolls by gravity along the tube B towards the load pan N, and the balance being thus disturbed suddenly the load pan tips down at once. When the pan is unloaded the beam is tipped back by the weight in the pan M and it carries the tube B with it and causes the ball C to return by gravity to the left hand end of the tube, the scale being thus reset for another weighing.

What I claim as my invention and desire to secure by Letters Patent is:—

1. A draft attachment for beam scales comprising a tube pivotally mounted on the beam, a ball in said tube and acting to tip the beam by rolling under the influence of gravity towards the load pan immediately the beam has passed a horizontal position, and a carrier on the scale frame engaging with the tube for preventing said tube from resting on the rising end of the beam until the beam is partially tipped.

2. In combination with a beam scale, a tube carrying a rolling ball, a pivotal support on the load pan end of the beam for one end of said tube, a relieving support on the frame for the other end of said tube, and a pillar on the weight pan end of the beam adapted to lift the tube from the relieving support before the beam and the tube have attained the horizontal position.

3. The combination with a beam scale, of a tube B carrying a rolling gravity ball C, a trunnion support E F on the load pan side of the beam, a relieving support H K on the frame for the end of said tube overlying the weight pan side of the beam, and an adjustable pillar G R on the weight pan side of the beam for taking the weight of the overlying end of the tube off the relieving support H K after the beam has commenced to cant.

4. The combination with a beam scale fitted with a tube B carrying an overbalancing gravity ball, of balance adjustments comprising a movable weight S hung pendularly below the beam axle and weight nuts d d' above the same on the end of the tube B.

5. The combination of beam O, tube B, rolling ball C therein, trunnion support E F, relieving support H K, pillar support G R, dial, and pointer A mounted on the beam axis.

In testimony whereof I have signed my name to this specification in the presence of two subscribing witnesses.

OSWALD JONES.

Witnesses:
P. RILEY,
W. J. DAVIS.